United States Patent [19]

Wetmore et al.

[11] 4,168,125
[45] Sep. 18, 1979

[54] LIGHT SENSING DEVICE

[75] Inventors: Harold B. Wetmore, Needham; Robert A. Harrow, Sudbury; William C. Holway, Acton, all of Mass.

[73] Assignee: General Energy Development Corporation, Needham, Mass.

[21] Appl. No.: 639,459

[22] Filed: Dec. 10, 1975

[51] Int. Cl.² ........................... G02B 9/14; G02B 9/34
[52] U.S. Cl. .................................... 356/227; 356/224
[58] Field of Search .............. 356/222, 224, 226, 227; 354/23 R, 31, 60 R, 60 E, 60 L; 307/311; 324/29.5

[56] References Cited

U.S. PATENT DOCUMENTS

| | | | |
|---|---|---|---|
| 1,990,361 | 2/1935 | Bailey, Jr. | 356/225 |
| 3,418,479 | 12/1968 | Schmitt | 356/226 |
| 3,552,862 | 1/1971 | Weinberg | 356/215 |
| 3,703,338 | 11/1972 | Breneman | 356/222 |
| 3,724,955 | 4/1973 | Takahashi | 356/227 |
| 3,781,119 | 12/1973 | Mori | 356/222 |

Primary Examiner—John K. Corbin
Assistant Examiner—Rolf Hille
Attorney, Agent, or Firm—Wolf, Greenfield & Sacks

[57] ABSTRACT

The sensing device is a light level indicator that comprises a light sensitive element such as a photo resistor, associated detection circuitry and "go" and "no go" indicator lights which determine whether the level of illumination is above or below a predetermined acceptable level for a given area being tested. The device may be constructed with two light sensitive elements one for sensing direct light and the other for sensing reflected light, or alternatively, the device may have only either element. A multi-position switch may also be provided which can be set at any one of a number of different threshold levels. An adapter is used with the device for checking the calibration of the device. This adapter comprises a radioactive source, holder and a mask which is periodically replaced for maintaining the source at a constant light output.

3 Claims, 6 Drawing Figures

LIGHT SENSING DEVICE

BACKGROUND OF THE INVENTION

The present invention relates, in general, to a light sensing device and is more particularly concerned with a light level indicator but provides a "go-no-go" condition. This condition may be indicated by a pair of indicator lights, one of which is red and the other of which is green and which are illuminated in a mutually exclusive manner to indicate whether the sensed light is above or below a predetermined threshold level.

With the passage of new federal legislation concerned with safety in many different areas, there has developed a need for devices that can sense predetermined light levels to determine if these levels are sufficiently high for proper working conditions. For example, in the mining area such as in the mining of coal, there is now a requirement that a predetermined light level be maintained in the mines. Some devices do exist for measuring light levels, of course, but these devices use a meter and thus are relatively complex. Furthermore, even though the law does require predetermined light level to be maintained these levels in a mine, for example, are still not that bright and thus with a meter instrument it is difficult to take an accurate reading. Another problem associated with known devices is that they usually require that a number of readings be taken in a particular area to obtain an accurate indication. These readings are then averaged which makes the operation rather time consuming.

Accordingly, one object of the present invention is to provide a light sensing device that is very simple to use and that does not require the reading of a meter. In accordance with the present invention the indicator device is a "go-no-go" type device that includes at least one indicator light for indicating whether the sensed light is not of a sufficient level as required.

Another object of the present invention is to provide a light level indicator that has an adjustable threshold level. In accordance with the present invention a multi-position switch is used for setting the threshold at one of a number of different levels. In this way the illumination to be measured in a particular area can be determined within the range of settings of the switch.

A further object of the present invention is to provide a level indicator that comprises two light sensing elements, one of which measures a direct light and the other of which measures reflected light from a relatively large surface.

Still another object of the present invention is to provide an adapter for the light level indicator of this invention which adapter comprises a radioactive source for checking the calibration of the device.

SUMMARY OF THE INVENTION

To accomplish the foregoing and other objects of this invention, there is provided a light sensing device that comprises a housing, at least one light sensitive element which is disposed in the housing with the housing having access means permitting light to impinge upon the light sensitive element. This element may be a photoresistor or a phototransistor. An amplifier means is provided for amplifying the signal from the light sensitive element to provide an electrical level signal corresponding to the level of sensed light. An adjusting means is preferably provided for calibrating the electrical level signal with the light level. The circuitry of the device also includes a bistable means which has two states. A pair of illuminating means couples to the bistable means and the housing has openings for receiving these illuminating means so that they can be observed outside of the housing. In an alternate embodiment a single illuminator could be used but a more fail-safe device uses both indicator lights. A trigger means coupled between the amplifying means and the bistable means is responsive to the value of the electrical level signal exceeding a predetermined threshold level for changing the state of the bistable means which in turn causes a change of illumination of the illuminating means so that the one that was previously on turns off and the other one that was previously off, turns on.

Also, in accordance with the present invention there may be provided two light sensitive elements, one of which is for detecting direct light and the other one of which is for detecting reflected light. The element for detecting reflected light preferably has an optical imaging system associated therewith. The device includes a mode select switch for selecting either element. The device may also be provided with a switch means which may be set in a number of different positions for providing different predetermined threshold levels. Each switch level corresponds to a threshold reading in foot-candles for the direct light measuring mode and in foot-lamberts for the reflected light measuring mode. An operate switch is used which is normally in its standby position and may be moved to one position for testing the batteries of the device and to a second position for taking a reading.

In accordance with this invention an adapter is also provided comprising a radioactive source of light in combination with a mask which is periodically replaced to maintain the light output within an acceptable range.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
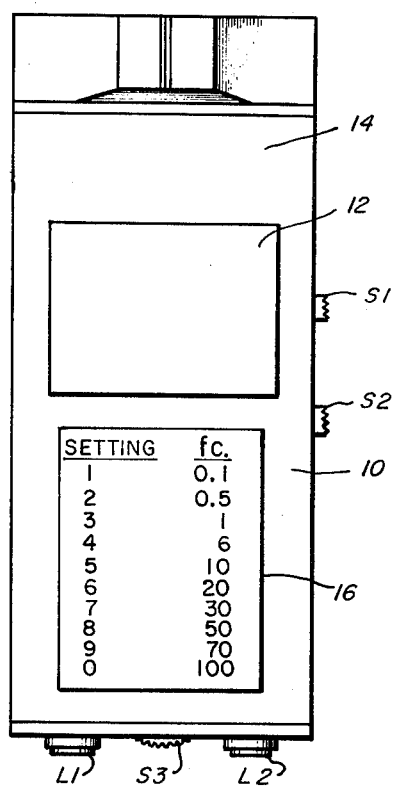
FIG. 1 is a front view of one device constructed in accordance with the principles of the present invention.
Figure 2:
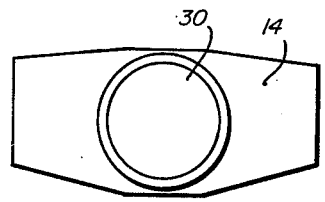
FIG. 2 is a top view of the device shown in FIG. 1.
Figure 3:
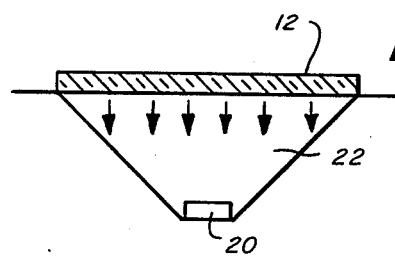
FIG. 3 shows one of the light sensitive elements that may be used with a device of this invention.
Figure 4:
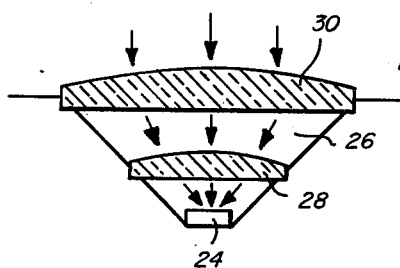
FIG. 4 shows the other light sensitive element that may be used with a device of this invention.

FIGS. 1 and 2 show one of the devices that can be constructed in accordance with the principles of this invention. The device comprises a housing 10 which may be constructed of plastic and contains one or more light sensing elements, associated circuitry, and "go-no-go" indicator lights. A diffuser plate 12 covers one of the photoresistor sensors, and the other sensor is disposed at the top end 14 of the housing. Plate 12 may be a cosine correction diffuser. FIGS. 3 and 4, respectively, show the two light sensing elements which are discussed in more detail hereinafter. FIG. 1 also shows the switches S1 and S2 which are disposed along one side of the housing 10. Switch S1 is a momentary two-position switch which is discussed in more detail hereinafter with reference to the schematic diagram shown in FIG. 5. This switch can be pushed to one position for testing the batteries of the device and is pushed to the alternate position for reading from the device. Switch S2 is a mode selection switch which selects one of the two sensing elements.

In the particular device shown in FIGS. 1 and 2, there is also provided a third multi-position switch S3. This switch has associated therewith a resistor string which establishes different threshold levels depending upon the position of the switch. In the face area 16 of the housing 10, there may be provided a listing of each of the switch positions with the corresponding threshold light level in foot-candles and/or footlamberts. For example, switch setting #1 may correspond to a threshold light level of 0.1 foot-candles and a switch setting of #6 may correspond to a threshold light level of 20 foot-candles. In any particular position of the switch S3 and with the switch S1 in the foot-candle mode for measuring direct light via the sensor under diffuser plate 12, the switch S1 may be operated to its read position and one of the indicator lights L1 or L2 is illuminated depending upon whether the direct light is of a magnitude above or below the threshold level. Light L1 may be either an incandescent lamp or a light emitting diode having a red filter associated therwith. On the other hand light L2 may either be an incandescent light or a light emitting diode having a green filter associated therwith. When the red light is illuminated this indicates that the sensed light is at a level which is unacceptable or below the threshold level. On the other hand when the green light is illuminated, this of course, indicates that the light level is of a sufficient value above the acceptable threshold level set by switch S3.

Figure 5:
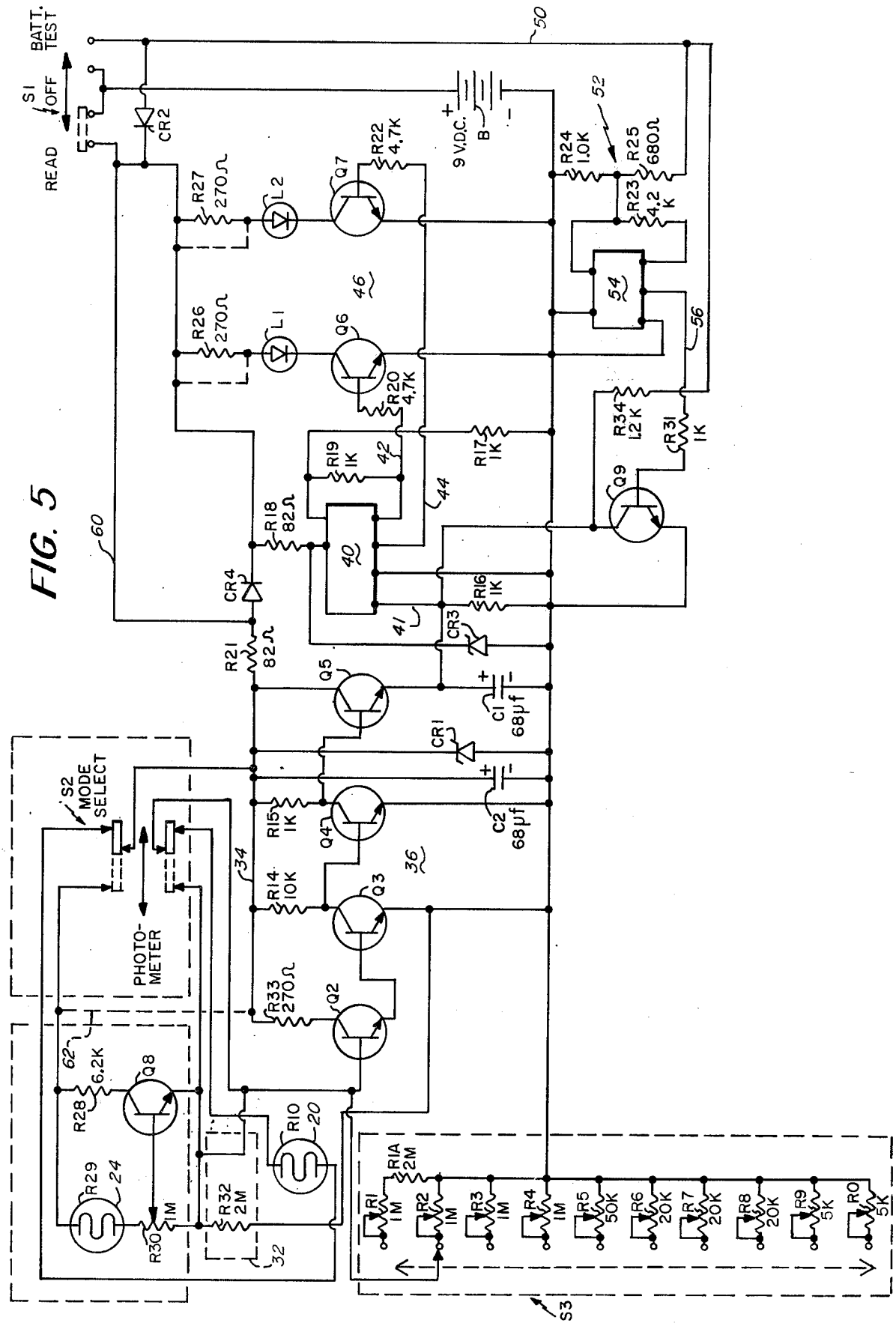
FIG. 5 is a schematic diagram showing the circuitry associated with this invention.

FIG. 5 shows the switch S3 connected at the front end of the circuit. However, in another embodiment the threshold can be switched at a different point in the circuit such as by using the switch S3 in association with device 40 preferably at its input.

The device shown in FIGS. 1 and 2, as previously mentioned, includes two light sensing devices. In other devices constructed in accordance with this invention only a single light sensing device may be used. With one such device only direct light is sensed and with another device only reflected light is sensed. In the device that senses only direct light there may be a switch S3 associated therewith or this switch may be removed.

FIG. 3 schematically shows the light sensitive element in the form of a photoresistor 20 contained within a cavity 22 in the housing below the diffuser plate 12 which is also shown in FIG. 1. The photoresistor 20 is for measuring direct (incident) light which is measured in foot candles. On the other hand FIG. 4 shows the other photoresistor 24 which is disposed at the top end 14 of the housing in a cavity 26 which also receives lenses 28 and 30. This optical lensing system collects reflected light over a relatively large area of a wall, for example, and images this collected light onto the photoresistor 24. Thus, the photoresistor 24 measures reflected light which is expressed in foot-lamberts. Both photoresistors 20 and 24 are connected to the circuitry shown in the schematic diagram of FIG. 5.

FIG. 5 is a schematic electrical diagram associated with the devices of this invention. As previously mentioned the device can be constructed with the use of both photoresistors or in alternate embodiments the device can be constructed with either photoresistor.

The circuitry shown in FIG. 5 shows all possible components that could be used in constructing any one of the devices. For example, in constructing the device shown in FIG. 1, both photoresistors are included in the circuit but because of the inclusion of both of these photoresistors the circuit 32 is removed. The circuit 32, on the other hand, is used in the embodiment that does not use switch S2 or photoresistor 20 but that does use photoresistor 24. In this embodiment of the device the circuit 32 is necessary in order to couple the photoresistor 24 to the amplifier means which comprises transistor Q2.

The photoresistor 24 has a potentiometer R30 in series therewith and also has a transistor Q8 associated therewith. As the light intensity varies so does the resistence of photoresistor 24. This causes a voltage change across potentiometer R30 which is sensed by transistor Q8. In the embodiment shown in FIG. 1 comprising both photoresistors, the photoresistor 24 and its associated circuitry is directly coupled to switch S2. The photoresistor 20 is also coupled directly to switch S2 and depending upon the position of this switch either one of the photoresistors is coupled to transistor Q2. The common terminals from switch S2 couple to line 34 which is a common +V voltage level and to the base of transistor Q2. It is noted that the switch S3 with its associated resistor string also couples to the base of transistor Q2.

The amplification circuitry 36 comprises transistors Q2, Q3, Q4 and Q5. These transistors are arranged so that as the voltage at the base of transistor Q2 increases, so also does the base voltage at the base of transistor Q5. Thus, there is developed across capacitor C1 and resistor R16 a voltage corresponding to the level of illumination on the associated photoresistor. The voltage for operating the amplifier circuit 36 is coupled from the switch S1 by way of resistor R21 and zener diode CR1. This establishes a regulated voltage for the collectors of the transistors comprising the amplifier circuit 36. Resistor R18 and zener diode CR3 similarly provide a regulated voltage for the schmidt trigger circuit 40 which may be an SN7413 sold, for instance, by Signetics Corporation. The schmidt trigger 40 is a conventional device which receives its input on line 41 from the emitter of transistor Q5. The output from the device 40 is coupled by way of lines 42 and 44 to transistors Q6 and Q7, respectively, which comprise a bistable device 46.

The bistable device 46 comprises, in addition to transistors Q6 and Q7, light devices L1 and L2 connected in the collector circuit of the transistors. The devices L1 and L2 may be incandescent lamps or they may be light emitting diodes. If light emitting diodes are used, then a resistor is required as shown in FIG. 5 in series with each diode. In order to construct an intrinsically safe device the light emitting diodes are used as the current requirements are lower than with the use of incandescent lamps.

The trigger device 40 has a high level signal on line 42 when the light level that is sensed is below the threshold level. This high level signal is coupled to the base of transistor Q6 and causes transistor Q6 to conduct thereby illuminating the red indicator light L1 indicating that the sensed light is below the threshold level. When the sensed light is greater or increases, then the circuit 40 triggers and there is a low level signal on line 42 which couples to the base of transistor Q6 causing transistor Q6 to cut off. The bistable device 46 also comprises feedback circuitry including resistor R19 so that the bistable device is operated in a mutually exclusive manner. In other words, when the threshold level is reached and transistor Q6 ceases to conduct, this signal almost concurrently causes a high level output on line 44 by the feedback action through resistor R19 causing transistor Q7 to conduct. This action illuminates the green light indicating a light level above threshold. The trigger circuit 40 and bistable circuit 46 thus operate so that only the red indicator light remains on as long as the light intensity is below the threshold level or alternatively only the green indicator light remains on when the sensed light level exceeds this threshold level. At no time are both indicator lights on with the circuit shown in FIG. 5. As previously mentioned only one indicator can be used but the operation is not as fail-safe.

FIG. 5 also shows the switch S1 which has an inactive intermediate position. This switch may be moved to either its battery test position or its read position. In the battery test position the battery B is coupled by way of line 50 and voltage divider 52 to the battery voltage sensing device 54. Device 54 is shown as a battery voltage sensing device sold by Bomar Corp. and identified as device BL1200N. Alternatively, the device may be a comparator that senses whether the battery voltage is of a sufficient magnitude for operation of the circuit. The output from this device is on line 56 which couples to transistor Q9. When the battery voltage decreases to a predetermined value the device 54 is operated and the level on line 56 changes. It is noted that transistor Q9 has its collector coupled to the input line 41 of the trigger circuit 40. With this arrangement and with the switch maintained in this battery test position, the indicator lights L1 and L2 are effectively used to determine whether the battery has sufficient power to operate the circuit when the switch is subsequently thrown to the read position.

When the battery B is at its full charge the device 54 is maintained in a predetermined condition wherein line 56 is at a low level maintaining transistor Q9 out of conduction. The collector of transistor Q9 is thus at a positive level which triggers the trigger circuit 40 so that the transistor Q7 is on and the green light is illuminated indicating that the batteries are in an operable condition. On the other hand, if the battery voltage is low then the device 54 switches to its alternate state and transistor Q9 conducts. Under that condition the trigger circuit is not triggered and the red indicator light illuminates indicating that the battery voltage is low and that the battery should be replaced. It is noted that during the battery test the voltage by way of line 60 is interrupted by switch S1 and thus the trigger circuit 40 cannot be operated during battery test from transistor Q5. Subsequently, when the switch S1 is moved to the read position, then the battery test circuitry is disconnected and the reading takes place in the normal manner from one or the other photoresistor.

Hereinbefore has been discussed the operation of the device when both photoresistors are used. In a slightly different embodiment of the invention only the photoresistor 24 is used in which case the switch S2 is eliminated and connection 62 is made which is shown in dotted in FIG. 5 so that one side of the photoresistor 24 is connected to the line 34. In this arrangement the photoresistor 20 is not used but the circuit 32 is added so that the other side of the photoresistor 24 can couple to the amplifier circuitry 36. With this arrangement one side of resistor R32 couples to the emitter of transistor Q3 and the other side of resistor R32 couples to the base of transistor Q2. With this arrangement the switch S3 and its associated resistors are not used but may be replaced by a potentiometer or fixed value resistor connecting from the base of transistor Q2 to ground.

In the embodiment disclosed in FIG. 1 wherein both photoresistors are used in the device and when the mode switch S2 is in a position for sensing light from photoresistor R10, then the switch S3 can be operated to different positions to determine if the sensed level is above or below a particular threshold level that the switch is selected at. On the other hand if the mode select switch is in its alternate position with light being sensed by photoresistor 24, then the switch S3 is preferably maintained in its #1 position for any readings taken in this mode of operation.

The device may also be constructed using the photoresistor 20 but not using the photoresistor 24. In this case the mode select switch S2 is also eliminated but the switch S3 is used. For this arrangement the photoresistor 20 is simply coupled, one side to line 34 and the other side directly to the base of transistor Q2. With this arrangement only direct light is detected but the switch S3 can be used in a number of different positions to determine whether in any one position the detected light is above or below the selected threshold level.

Figure 6:
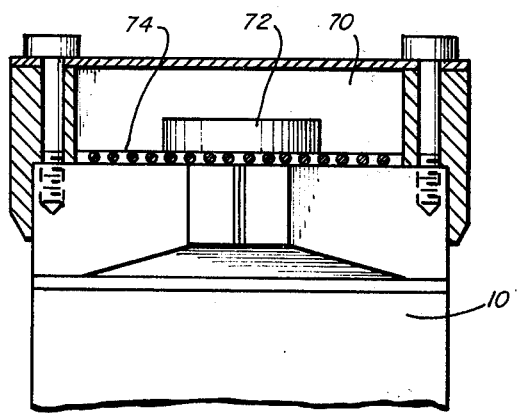
FIG. 6 is a view similar to that shown in FIG. 1 but with a calibrating adapter secured to the device.

Referring now to FIG. 6, there is shown an adapter 70 which fits over the end of the device 10. The device 10 shown in FIG. 6 may be of the type shown in FIG. 1 or may be a device that comprises only the photoresistor 24. If the device is of the type that includes only the photoresistor 24, then the threshold level is set by the adjustment of potentiometer R30. When the adapter 70 is inserted over the device, the potentiometer R30 may be adjusted so that the device just triggers to its safe indicating level. The adapter preferably comprises a housing for containing a radio-active light source 72 having a mask 74 disposed therebelow. The radio-active light source 72 may comprise a glass envelope which is coated internally with a phosphor like a conventional phosphorescent tube. The phosphor is excited to luminesce by low energy beta particles given off by tritium gas enclosed in the envelope. The light source may also be a krypton excited light source with a surface brightness of 0.05 foot-lamberts. The krypton gas source is provided with a saphire window. There are a number of other different types of radio-active light sources that are available. American Atomics Corporation of Tuscon, Ariz. is one of the prime sources for these light sources. Although these sources are extremely accurate, because of the half-life of the radio-active materials these sources decrease in illumination. However, this decrease is predictable in accordance with the known half-life of the particular radio-active material. In accordance with this invention a mask 74 is selected so that originally the desired light level which is less than the total light level from source 72 is directed to the photoresistor. After a predetermined period of time which may be, for example, six months the mask is changed so that the masked area decreases thereby compensating for the decrease in the light level from the light source. The masks are replaced at intervals sufficient to maintain the light source within a desired calibration range.

What is claimed is:
1. A light sensing device comprising;
   a housing,
   a light responsive means disposed in the housing with said housing having means permitting light to im- pinge upon the light responsive means which in turn converts the light level into a representative electrical signal, threshold sensing means, multi-position switch means associated with one of the light responsive means and threshold sensing means for establishing a number of different threshold levels of detection;

means for amplifying the signal from the light responsive means and coupling the amplified signal to the threshold sensing means, bistable circuit means including a pair of transistors each having at least a control electrode and a main electrode, a pair of indicator means coupled respectively to the main electrodes of the transistors of the bistable means, battery means, a battery voltage sensing circuit coupled from the battery means and including means for sensing whether the battery voltage is above or below a low battery voltage threshold level, a second multi-position switch connected to said battery means and having one position coupling the battery voltage to at least the threshold sensing means and a second position for coupling the battery voltage to the battery voltage sensing circuit;

said threshold sensing means including a trigger circuit having a pair of outputs coupling respectively to the transistors of said bistable means and a pair of inputs one coupling from the amplifier means and another coupling from the battery voltage sensing circuit, said trigger circuit including means for mutually exclusively operating the transistors of said bistable means so that only one indicator means is illuminated at a time, said battery voltage sensing circuit adapted in one condition of the battery to operate the trigger circuit in a first state for illuminating one of the indicator lights, and in a second condition of the battery to operate the trigger circuit in a second state for illuminating a second one of the indicator lights.

2. A light sensing device comprising;

a housing, a light responsive means disposed in the housing with said housing having means permitting light to impinge upon the light responsive means which in turn converts the light level into a representative electrical signal, threshold sensing means, means associated with one of the light responsive means and threshold sensing means for establishing a threshold level of detection;

means for amplifying the signal from the light responsive means and coupling the amplified signal to the threshold sensing means, bistable circuit means including a pair of transistors each having at least a control electrode and a main electrode, a pair of indicator means coupled respectively to the main electrodes of the transistors of the bistable means, battery means, a battery voltage sensing circuit coupled from the battery means and including means for sensing whether the battery voltage is above or below a low battery voltage threshold level, a multi-position switch connected to said battery means and having one position coupling the battery voltage to at least the threshold sensing means and a second position for coupling the battery voltage to the battery voltage sensing circuit;

said threshold sensing means including a trigger circuit having a pair of outputs coupling respectively to the transistors of said bistable means and a pair of inputs one coupling from the amplifier means and another coupling from the battery voltage sensing circuit, said trigger circuit including means for mutually exclusively operating the transistors of said bistable means so that only one indicator means is illuminated at a time, said battery voltage sensing circuit adapted in one condition of the battery to operate the trigger circuit in a first state for illuminating one of the indicator lights, and in a second condition of the battery to operate the trigger circuit in a second state for illuminating a second one of the indicator lights.

3. A device as set forth in claim 2 wherein said amplifier means comprises a plurality of transistors and associated biasing resistors, said indicator means each comprising a light emitting diode, and said battery sensing circuit comprising a voltage divider network, a battery voltage sensing device having its input coupled to the voltage divider network, and an output transistor having its control electrode coupled from the output of the battery voltage sensing device.

* * * * *